US008204057B2

(12) United States Patent
Marsico et al.

(10) Patent No.: US 8,204,057 B2
(45) Date of Patent: Jun. 19, 2012

(54) METHODS, SYSTEMS, AND COMPUTER PROGRAM PRODUCTS FOR PROVIDING AN ENRICHED MESSAGING SERVICE IN A COMMUNICATIONS NETWORK

(75) Inventors: Peter J. Marsico, Chapel Hill, NC (US); Cory A. Grant, Apex, NC (US); Robby D. Benedyk, Angier, NC (US)

(73) Assignee: Tekelec Global, Inc., Morrisville, NC (US)

( * ) Notice: Subject to any disclaimer, the term of this patent is extended or adjusted under 35 U.S.C. 154(b) by 109 days.

(21) Appl. No.: 11/809,200

(22) Filed: May 31, 2007
(Under 37 CFR 1.47)

(65) Prior Publication Data
US 2008/0101370 A1     May 1, 2008

Related U.S. Application Data

(60) Provisional application No. 60/854,651, filed on Oct. 26, 2006.

(51) Int. Cl.
*H04L 12/26* (2006.01)
*H04L 12/52* (2006.01)
(52) U.S. Cl. ............. 370/390; 370/395.3; 370/401; 455/405; 455/408; 455/414.1; 455/415; 709/206; 709/207
(58) Field of Classification Search .......... 370/390, 370/395.3, 401; 455/405–408, 414.1, 415, 455/466; 709/206–207
See application file for complete search history.

(56) References Cited

U.S. PATENT DOCUMENTS

| 5,684,951 | A | 11/1997 | Goldman et al. |
| 5,768,509 | A * | 6/1998 | Gunluk ............................ 709/203 |
| 6,047,327 | A | 4/2000 | Tso et al. |
| 7,072,667 | B2 * | 7/2006 | Olrik et al. .................. 455/456.1 |
| 7,072,976 | B2 | 7/2006 | Lee |
| 7,095,829 | B2 * | 8/2006 | Claudatos et al. ........... 379/88.22 |
| 7,116,972 | B1 * | 10/2006 | Zhang et al. ................ 455/414.1 |
| 7,120,455 | B1 * | 10/2006 | Chen et al. ...................... 455/466 |
| 7,136,634 | B1 * | 11/2006 | Rissanen et al. ............ 455/422.1 |
| 7,155,243 | B2 * | 12/2006 | Baldwin et al. ................ 455/466 |

(Continued)

FOREIGN PATENT DOCUMENTS

CN     1625146 A     6/2005

(Continued)

OTHER PUBLICATIONS

Notification of Transmittal of the International Search Report and the Written Opinion of the International Searching Authority, or the Declaration for International Application No. PCT/US07/22440 (Mar. 14, 2008).

(Continued)

*Primary Examiner* — Kwang B Yao
*Assistant Examiner* — Benjamin H Elliott, IV
(74) *Attorney, Agent, or Firm* — Jenkins, Wilson, Taylor & Hunt, P.A.

(57) ABSTRACT

Methods, systems, and computer program products for providing an enriched messaging service in a communications network is described. In one embodiment, the method comprises receiving a messaging service message addressed to a first destination address. A subscriber identifier in the message is utilized to access subscriber information contained in at least one subscriber information database. The subscriber information facilitates intelligent processing or interpretation of the message. The accessed subscriber information is then incorporated in the message to create an enriched message. The enriched message is transmitted.

24 Claims, 10 Drawing Sheets

U.S. PATENT DOCUMENTS

| | | | |
|---|---|---|---|
| 7,248,857 B1* | 7/2007 | Richardson et al. | 455/413 |
| 7,299,050 B2 | 11/2007 | Delaney et al. | |
| 7,321,779 B2* | 1/2008 | Kang | 455/466 |
| 7,394,818 B1 | 7/2008 | Johnson et al. | |
| 7,403,788 B2* | 7/2008 | Trioano et al. | 455/466 |
| 7,454,164 B2* | 11/2008 | Goss | 455/3.01 |
| 7,463,898 B2* | 12/2008 | Bayne | 455/466 |
| 7,502,335 B2* | 3/2009 | Lin | 370/278 |
| 7,548,756 B2* | 6/2009 | Velthuis et al. | 455/466 |
| 7,817,987 B2* | 10/2010 | Mian et al. | 455/412.2 |
| 7,912,908 B2* | 3/2011 | Cai et al. | 709/206 |
| 7,917,128 B2* | 3/2011 | Niekerk et al. | 455/414.1 |
| 2002/0010745 A1* | 1/2002 | Schneider | 709/206 |
| 2002/0013711 A1* | 1/2002 | Ahuja et al. | 705/1 |
| 2002/0023164 A1 | 2/2002 | Lahr | |
| 2002/0095333 A1 | 7/2002 | Jokinen et al. | |
| 2002/0120717 A1 | 8/2002 | Giotta | |
| 2002/0126708 A1 | 9/2002 | Skog et al. | |
| 2002/0147928 A1 | 10/2002 | Mahajan et al. | |
| 2003/0003935 A1* | 1/2003 | Vesikivi et al. | 455/517 |
| 2003/0027591 A1 | 2/2003 | Wall | |
| 2003/0032409 A1* | 2/2003 | Hutcheson et al. | 455/414 |
| 2003/0069991 A1* | 4/2003 | Brescia | 709/245 |
| 2003/0076941 A1 | 4/2003 | Tiliks et al. | |
| 2003/0093314 A1 | 5/2003 | Leung et al. | |
| 2003/0096625 A1 | 5/2003 | Lee et al. | |
| 2003/0131263 A1 | 7/2003 | Keane et al. | |
| 2004/0054576 A1* | 3/2004 | Kanerva et al. | 705/14 |
| 2004/0137922 A1* | 7/2004 | Kang | 455/466 |
| 2004/0203581 A1 | 10/2004 | Sharon et al. | |
| 2004/0221011 A1 | 11/2004 | Smith et al. | |
| 2004/0243719 A1* | 12/2004 | Roselinsky | 709/245 |
| 2005/0003838 A1* | 1/2005 | McCann et al. | 455/466 |
| 2005/0021666 A1* | 1/2005 | Dinnage et al. | 709/217 |
| 2005/0027867 A1 | 2/2005 | Mueller et al. | |
| 2005/0068971 A1* | 3/2005 | Meisl et al. | 370/401 |
| 2005/0130685 A1* | 6/2005 | Jenkin | 455/466 |
| 2006/0047572 A1* | 3/2006 | Moore et al. | 705/14 |
| 2006/0120358 A1 | 6/2006 | Narasimhan et al. | |
| 2006/0168003 A1* | 7/2006 | Vau et al. | 709/206 |
| 2006/0199597 A1* | 9/2006 | Wright | 455/466 |
| 2006/0218613 A1* | 9/2006 | Bushnell | 725/109 |
| 2006/0253453 A1* | 11/2006 | Chmaytelli et al. | 707/10 |
| 2007/0026878 A1* | 2/2007 | Midkiff et al. | 455/466 |
| 2007/0072591 A1* | 3/2007 | McGary et al. | 455/414.1 |
| 2007/0088851 A1* | 4/2007 | Levkovitz et al. | 709/246 |
| 2007/0206747 A1 | 9/2007 | Gruchala et al. | |
| 2007/0271139 A1 | 11/2007 | Fiorini | |
| 2007/0275738 A1* | 11/2007 | Hewes et al. | 455/466 |
| 2007/0282954 A1* | 12/2007 | Kim et al. | 709/206 |
| 2007/0287463 A1* | 12/2007 | Wilson | 455/445 |
| 2008/0004046 A1 | 1/2008 | Mumick et al. | |
| 2008/0031196 A1* | 2/2008 | Marathe et al. | 370/331 |
| 2008/0051066 A1* | 2/2008 | Bandhole et al. | 455/413 |
| 2008/0101370 A1* | 5/2008 | Marsico et al. | 370/392 |
| 2008/0139170 A1 | 6/2008 | Kahn | |
| 2008/0161028 A1 | 7/2008 | Fondéet al. | |
| 2008/0285735 A1 | 11/2008 | Ravishankar et al. | |
| 2008/0287150 A1 | 11/2008 | Jiang et al. | |
| 2009/0017794 A1 | 1/2009 | Wilson | |
| 2009/0047980 A1 | 2/2009 | Wilson | |
| 2009/0111489 A1 | 4/2009 | Wilson | |
| 2010/0210292 A1 | 8/2010 | Nooren | |

FOREIGN PATENT DOCUMENTS

| | | |
|---|---|---|
| EP | 1 705 885 A1 | 9/2006 |
| KR | 10-0600335 | 7/2006 |
| KR | 10-2008-0054737 | 6/2008 |
| KR | 10-2008-0111175 | 12/2008 |
| WO | WO 99/49686 A2 | 9/1999 |
| WO | WO 01/06679 A1 | 1/2001 |
| WO | WO 02/39765 A1 | 5/2002 |
| WO | WO 02/063849 A1 | 8/2002 |
| WO | WO 02/078381 A1 | 10/2002 |
| WO | WO 03/001770 A2 | 1/2003 |
| WO | WO 03/088690 A1 | 10/2003 |
| WO | WO 2004/100470 A1 | 11/2004 |
| WO | WO 2004100470 A1 * | 11/2004 |
| WO | WO 2004/104735 A2 | 12/2004 |
| WO | WO 2004/105405 A2 | 12/2004 |
| WO | WO 2007/080570 A1 | 7/2007 |
| WO | WO 2007/141762 A1 | 12/2007 |
| WO | WO 2008/057259 A2 | 5/2008 |
| WO | WO 2008/085830 A1 | 7/2008 |
| WO | WO 2008/130565 | 10/2008 |
| WO | WO 2010/094038 A2 | 8/2010 |

OTHER PUBLICATIONS

Notification of Transmittal of the International Search Report and the Written Opinion of the International Searching Authority, or the Declaration for International Application No. PCT/US2008/000038 (May 21, 2008).

Notification of Transmittal of the International Search Report and the Written Opinion of the International Searchig Authority, or the Declaration for International Application No. PCT/US07/22664 (Mar. 14, 2008).

Notice of Allowance and Fee(s) Due for U.S. Appl. No. 10/844,149 (Sep. 21, 2007).

Advisory Action for U.S. Appl. No. 10/844,149 (Mar. 19, 2007).

Final Official Action for U.S. Appl. No. 10/844,149 (Aug. 11, 2006).

Notification of Transmittal of the International Search Report and the Written Opinion of the International Searching Authority, or the Declaration for International Application No. PCT/US2004/014734 (Feb. 10, 2006).

Official Action for U.S. Appl. No. 10/844,149 (Dec. 14, 2005).

"Digital Cellular Telecommunications System (Phase 2+); Mobile Application Part (MAP) Specificiation (3GPP TS09.02 Version 7.15.0 Release 1998)," GSM (Global System for Mobile Communications), ETSI TS 100 974, V7.15.0, p. 1-118 (Mar. 2004).

Roach, "Session Initiation Protocol (SIP)—Specific Event Notification," Network Working Group, RFC 3265 (Jun. 2002).

"Push Access Protocol," Wireless Application Protocol, WAP-247-PAP-20010429.a, Version Apr. 29, 2001, p. 1-49 (Apr. 29, 2001).

Communication pursuant to Article 94(3) EPC for European Application No. 04 751 900.4 (Oct. 4, 2010).

Notification of Transmittal of the International Search Report and the Written Opinion of the International Searching Authority, or the Declaration for International Application No. PCT/US2010/024317 (Oct. 4, 2010).

Official Action for U.S. Appl. No. 11/903,507 (Aug. 10, 2010).

"3$^{rd}$ Generation Partnership Project; Technical Specification Group Terminals; Technical Realization of the Short Message Service (SMS) (Release 1998)," 3GPP TX 03.40 V7.5.0, pp. 1-118 (Dec. 2001).

"3$^{rd}$ Generation Partnership Project; Technical Specification Group Terminals; Technical Realization of Cell Broadcast Service (CBS) (Release 1998)," 3GPP TS 03.41 V7.4.0, pp. 1-31 (Sep. 2000).

Summons to attend oral proceedings pursuant to Rule 115(1) EPC for European application No. 04751900.4 (Mar. 21, 2011).

Official Action for U.S. Appl. No. 11/977,723 (Feb. 17, 2011).

Final Official Action for U.S. Appl. No. 11/903,507 (Dec. 10, 2010).

First Office Action for Chinese Patent Application No. 200780048199.3 (Nov. 25, 2011).

Final Official Action for U.S. Appl. No. 11/977,723 (Sep. 29, 2011).

Final Office Action for Chinese Patent Application No. 200780048418.8 (Jun. 15, 2011).

Communication of European publication number and information on the application of Article 67(3) EPC for European Patent No. 2084861 (Jul. 8, 2009).

* cited by examiner

METHODS, SYSTEMS, AND COMPUTER PROGRAM PRODUCTS FOR PROVIDING AN ENRICHED MESSAGING SERVICE IN A COMMUNICATIONS NETWORK

RELATED APPLICATIONS

The presently disclosed subject matter claims the benefit of U.S. Provisional Patent Application Ser. No. 60/854,651, filed Oct. 26, 2006; the disclosure of which is incorporated herein by reference in its entirety.

TECHNICAL FIELD

The subject matter described herein relates to providing a messaging service in a communications network. More particularly, the subject matter described herein relates to methods, systems, and computer program products for providing an enriched messaging service in a communications network.

BACKGROUND

In mobile communications networks, short message service (SMS) is a service where subscribers and machines can send text messages to other subscribers and machines. If an SMS message originates from a mobile handset, the message is forwarded to a short message service center (SMSC) for delivery. The SMSC locates the destination, determines if the destination is available, and, if so, attempts to deliver the SMS message. If the destination is unavailable, the SMSC may store the message and reattempt delivery at a later time. If the SMS message originates from a machine, the machine may either deliver the message or the machine may forward the message to an SMSC for delivery.

Another type of messaging that is becoming prevalent in mobile communications networks is multimedia message service (MMS). MMS allows subscribers and machines to send text, audio, image, and video messages to other subscribers and machines. MMS is delivered using a mechanism similar to SMS, but requires additional bandwidth due to the increased message size.

One use for SMS and MMS in addition to communication between subscribers is advertising. For example, ad servers may generate SMS or MMS messages that contain advertising content and send the messages to handsets. In one application, ads may be sent to handsets based on the locations of the handsets. For example, when a handset is in an area near a particular restaurant, the subscriber may receive an ad for that restaurant.

One problem with current services that use SMS or MMS to deliver ads and other services is that such services are believed to require that the owner of the ad server perform all of the information gathering in order to deliver a targeted message to the handset. For example, in the case of targeted advertising, the ad server that originates the message may be required to determine the subscriber's location, any subscriber preferences, and generate an SMS message including an ad that is targeted to the subscriber. Requiring such intelligence at the ad server decreases the likelihood that an ad will be effective in convincing a subscriber to purchase a good or service. For example, the ad servers may be managed by third parties that do not have access to subscriber information required to generate the appropriate targeted ad.

Another problem with current services that use SMS or MMS to deliver ads and other services is that such services typically only push ads that purport to be targeted from a machine to the subscriber based on information gathered by the machine from sources external to the subscriber. Current SMS ad services are not believed to analyze a subscriber's response to an ad in order to determine a subsequent ad or service to be sent to the subscriber. Instead, current SMS ad services are believed to be based on a unidirectional push model where ads are pushed to handset, for example, based on the handset's location.

Accordingly, in light of these difficulties, there exists a need for methods, systems, and computer program products for providing an enriched messaging service in a communications network.

SUMMARY

According to one aspect, the subject matter described herein comprises methods, systems, and computer program products for providing an enriched messaging service in a communications network. One method includes receiving a messaging service message addressed to a first destination address. A subscriber identifier in the message is utilized to access subscriber information contained in at least one subscriber information database. The subscriber information may include subscriber preference information and/or contact information for facilitating the delivery of an ad or other service to the subscriber. The accessed subscriber information is then incorporated in the message to create an enriched message. The enriched message is transmitted.

The subject matter described herein for providing enriched message service may be implemented using a computer program product comprising computer executable instructions embodied in a computer readable medium. Exemplary computer readable media suitable for implementing the subject matter described herein includes disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
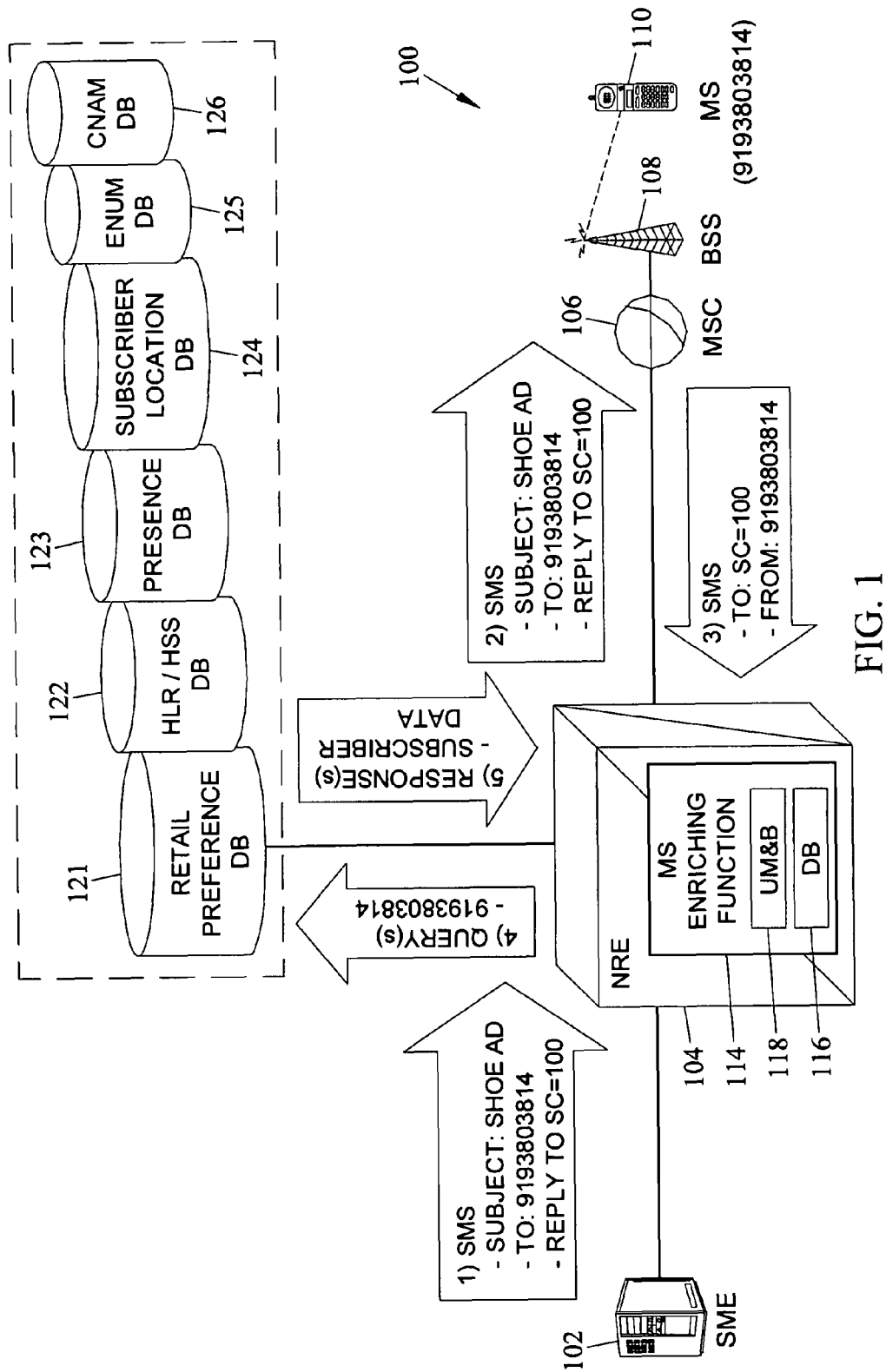
FIG. 1 is an exemplary communications network utilizing an enriched messaging service system according to an embodiment of the subject matter described herein.

The present subject matter relates to systems and methods for providing enriched messaging service in a communications network. According to one aspect of the present subject matter, a method for providing enriched messaging service includes intercepting a messaging service message (e.g., short messaging service message, multimedia messaging service message, instant messaging service message, and the like) during transit through a communications network and subsequently adding enriching information to the messaging service message is described. As used herein, "enriching information" refers to any information that adds content to the message other than information used to specifically route or deliver the message (e.g., addressing data). Enriching information may include information associated with either a sending or a receiving messaging service subscriber. FIG. 1 illustrates an exemplary communications network 100 for providing an enriched messaging service according to an embodiment of the subject matter described herein.

Referring to FIG. 1, network 100 may include a machine-based short message entity (SME) 102, a network routing element 104, a mobile switching center (MSC) 106, a base station system (BSS) 108, a mobile station (MS) 110, and a plurality of databases 121-126. Although FIG. 1 depicts six databases, those skilled in the art realize that more (or less) databases may be employed. The databases may also either be co-located (as depicted in FIG. 1) or positioned at separate locations.

SME 102, which may be a stand-alone computer, server, or like device, may be configured to generate a short messaging service (SMS) message addressed to an endpoint device, such as mobile station (MS) 110, which is associated with a subscriber (e.g., a mobile customer). The generated SMS message may include a short code (SC) address to which the mobile subscriber may reply back to SME 102. In one illustrative example, SME 102 is associated with Company A, which manufactures sporting equipment and apparel. SME 102 may be configured to generate an SMS message (intended for MS 110), such as an advertisement for Company A's new sports shoe, which is initially transmitted from SME 102 to network routing element 104. Network routing element 104 may comprise a signal transfer point (STP), a SS7-IP signaling gateway (SP), a short message gateway (SMG), or like device. In one embodiment, a short message peer to peer (SMPP) protocol over IP is used to facilitate the transmission of the SMS message from SME 102 to network routing element 104. Afterwards, network routing element 104 may forward the SMS message to MSC 106 using any suitable protocol (e.g., the mobile application part (MAP) protocol). MSC 106 then transmits the message to the MS 110 via BSS 108.

FIG. 1 also illustrates an exemplary manner in which MS 110 responds to the received SMS message. Upon receiving the message, MS 110 may be used by a subscriber to indicate interest in the received advertisement (e.g., a shoe ad). More specifically, the subscriber may be able to request additional information or a coupon related to the original message by responding to the original SMS message using a short code (SC). In one embodiment, the response comprises an SMS message that is "addressed" to the short code included in the original message, e.g., SC=100. The SMS response message may also include an identifier, such as a mobile station integrated services digital network (MSISDN) identifier, a mobile identification number (MIN), an international mobile subscriber identifier (IMSI), or the like, which identifies the subscriber.

Figure 2:
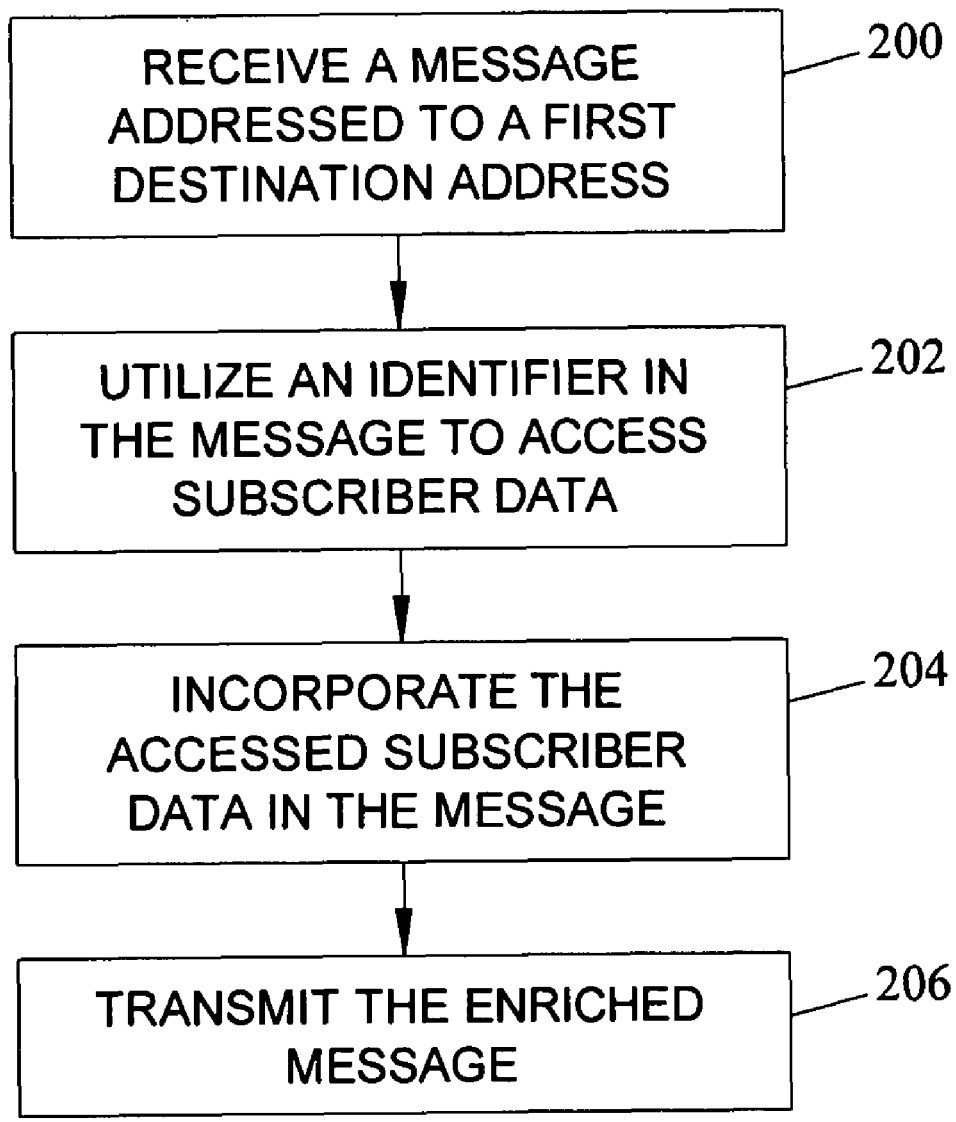
FIG. 2 is a flow chart illustrating exemplary steps for providing enriched messaging service in a communications network according to an embodiment of the subject matter described herein.

In one embodiment, the SMS reply message from MS 110 is ultimately received or intercepted by network routing element 104. After receiving the SMS response, network routing element 104 may perform a number of actions. One such action is depicted in FIG. 2, which is a flow chart that illustrates the exemplary steps for providing an enriched messaging service in a communications network in communications network 100 according to an embodiment of the subject matter described herein. In block 200, a network routing element 104 may receive a message addressed to a first destination address (e.g., a short code address). In one embodiment, the message may comprise a response message from MS 110, which can include a short code address and a subscriber identifier. The short code address may correspond to the address of a server associated with the party that sent the ad. In block 202, the identifier in the message is utilized to access enriching data. In one embodiment, an enriching function (e.g., SMS enriching function 114) accesses one or more databases (e.g., databases 121-126) to obtain additional information regarding the subscriber by using the subscriber identifier contained in the response message. More specifically, SMS enriching function 114, which resides on the network routing element 104, may be configured to query one or more databases (e.g., databases 121-126) to obtain additional subscriber information, which may include any information that facilitates the selection of an ad or the provision of another service to the subscriber. This type of subscriber information may include personal information (e.g., name, age, and gender), street address information (e.g., street number, city, state, and zip code), geographic location information (e.g., GPS positional coordinate information, serving MSC\NLR information, and serving cellular network cell identifier information), alternate contact address information (e.g., electronic mail address information, instant message address information, mail to URI information, and mobile or fixed telephone number information), presence status information, retail purchasing/shopping preference information (e.g., retailer preference information and local store preference information), retail purchasing history information (e.g., product-specific purchase history statistics and retailer-specific purchase history statistics), advertisement response history information (e.g., percent response to short code advertisements by product and percent response to short code advertisements by product or by retailer), credit or financial information (e.g., credit history/score, pre-paid service balance information, bank account balance information, and credit card validation information), and other like information.

Figure 3:
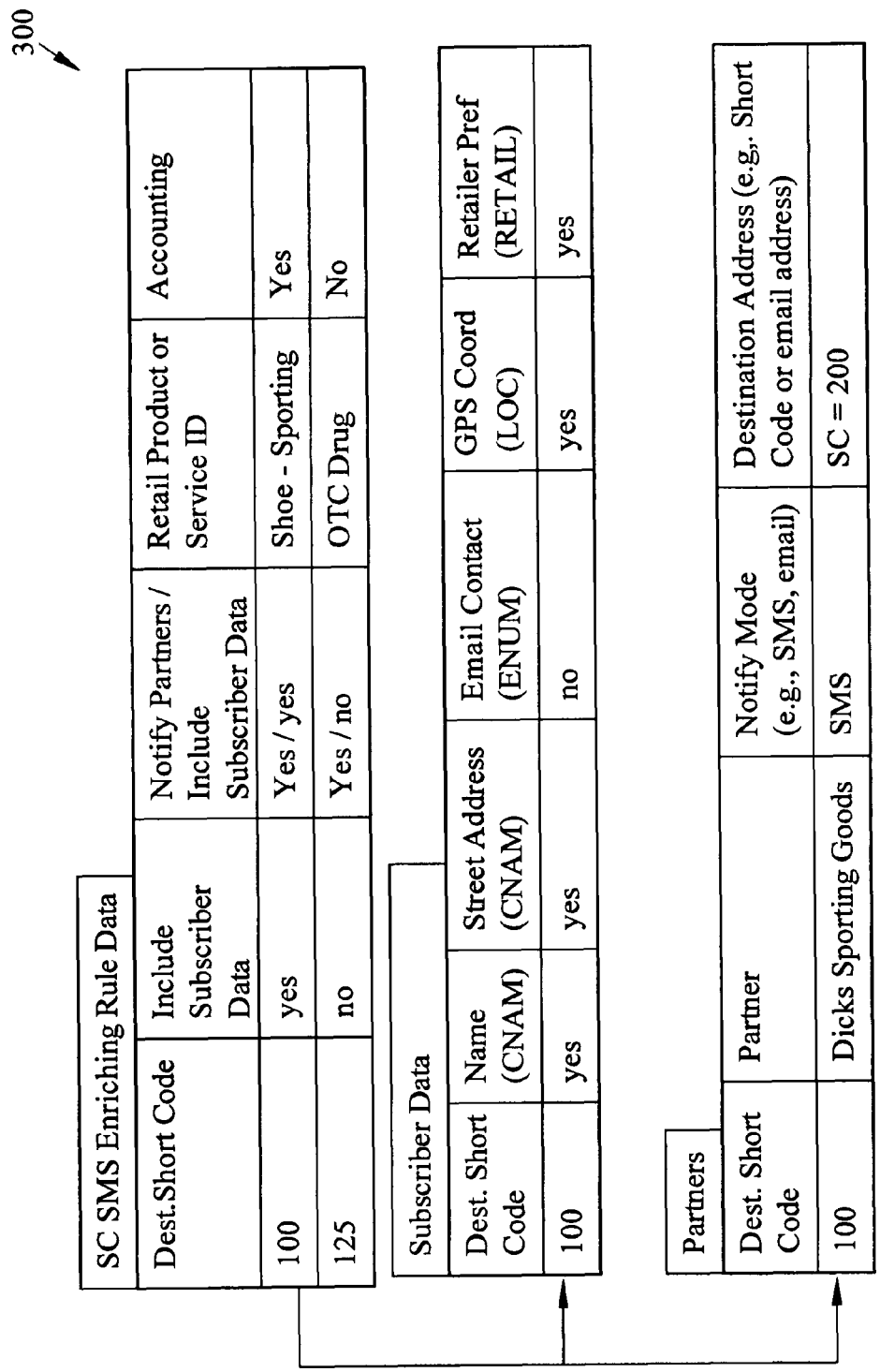
FIG. 3 is an exemplary data structure including enriching rules and actions in a communications network according to an embodiment of the subject matter described herein.

In one embodiment, the manner in which network routing element 104 obtains the subscriber information is set forth by the instructions within a rules/policy database 116. For example, rules/policy database 116 associated with enriching function 114 may contain messaging service enriching rules that are applied to the intercepted messaging service messages. In general, messaging service enrichment rules specify the type(s) of enriching actions that are to be performed for each intercepted messaging service message. An exemplary data structure containing exemplary enriching rules and actions are presented in FIG. 3. In data structure 300 presented in FIG. 3, enriching rules are defined for destination short code addresses. For example, data structure 300 indicates that the intercepted messages that are addressed to destination short code address SC=100 should have subscriber data added to the intercepted SMS message. In one example, network routing element 104 may include subscriber name information, subscriber street address information, GPS coordinates/location information, and retailer preference information in the intercepted SMS message. To obtain this desired information, SMS enriching function 114 is configured to query (or access) calling name (CNAM) database 126, subscriber location database 124, and retailer preferences database 121. Accordingly, enriching function 114 may generate the appropriately formatted query messages required to access each of the respective databases and also interpret the corresponding response messages from each of the databases.

Returning to FIG. 2, the accessed subscriber information is incorporated in the message in block 204. In one embodiment, after querying the databases, subscriber information is returned via a response message(s) to messaging service enriching function 114. Depending on the embodiment, the intercepted SMS message may be modified by enriching function 114 to include a portion or all of the returned subscriber information. By doing so, the enriching function 114 creates a new modified enriched message. For instance, a portion of the returned enriching information may only be needed to appropriately route or re-direct the SMS message. UM&B data in database 118 may also be updated to reflect the enriching action(s). In block 206, enriching function 114 transmits the modified enriched message to the appropriate SME.

Figure 4:
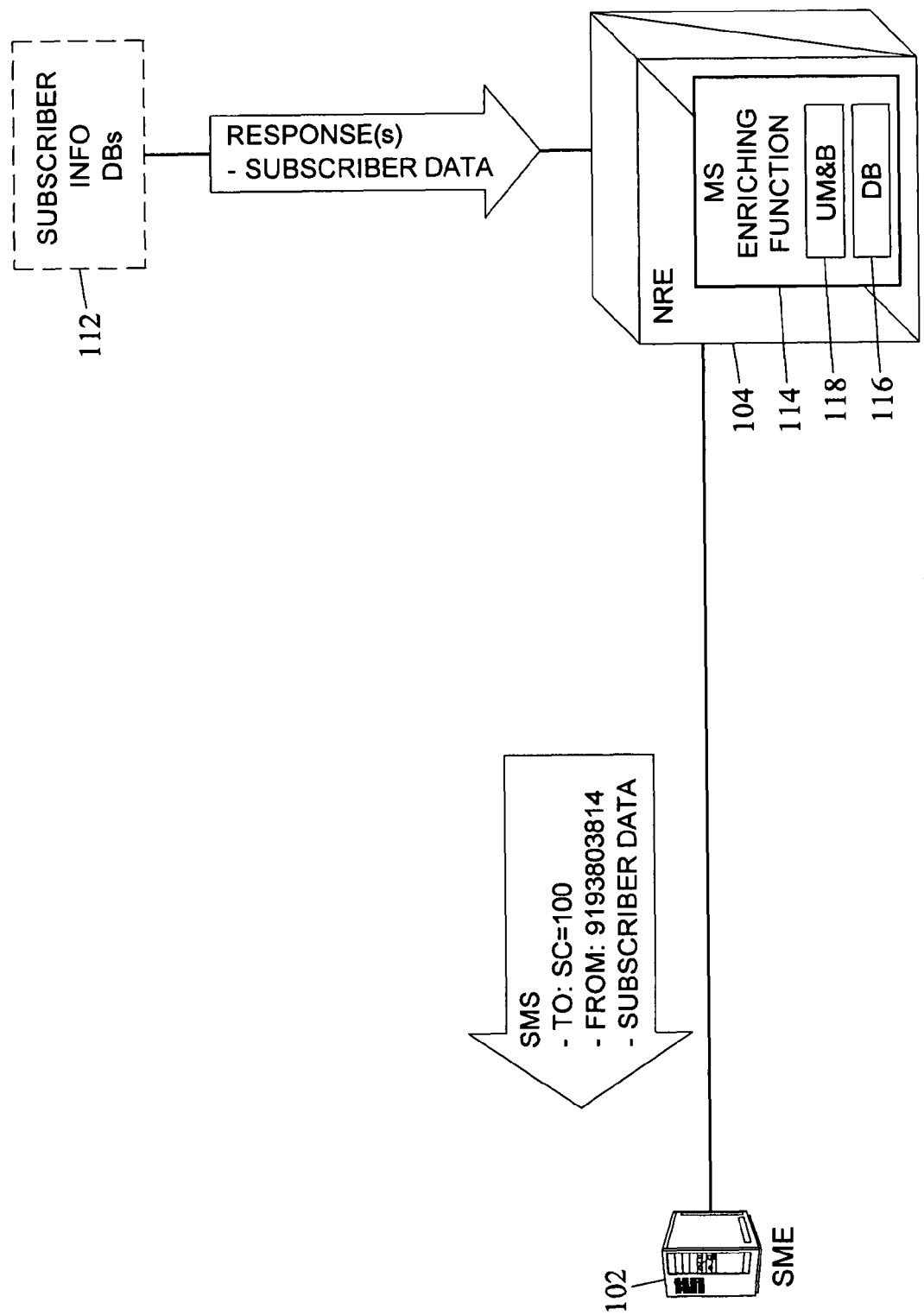
FIG. 4 depicts a portion of the exemplary communications network shown in FIG. 1 and the transmission of a response message to the short message entity (SME) according to an embodiment of the subject matter described herein.

Depending on the embodiment, the modified enriched message may be transmitted in a number of different manners. FIG. 4 illustrates one embodiment in which the intercepted SMS message is routed to the originating SME (i.e., SME 102) after being modified with the enriching information. The modified message is appropriately routed since the short code address (i.e., SC=100) included in the original SMS response message corresponds to SME 102.

Figure 5:
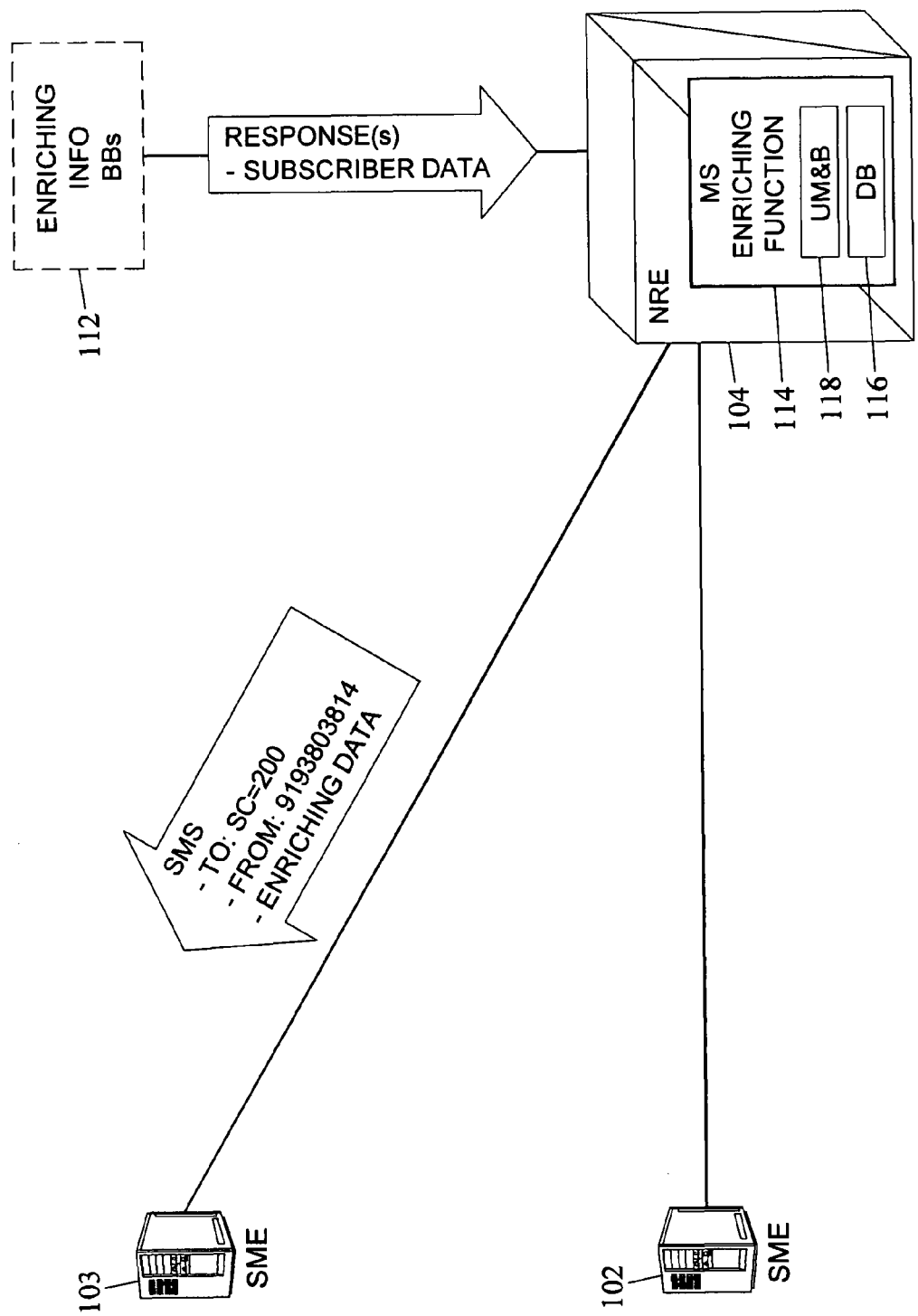
FIG. 5 depicts a portion of the exemplary communications network shown in FIG. 1 and the transmission of a response to an alternate SME according to an embodiment of the subject matter described herein.

In an alternate embodiment, a "third party partner" may be notified in lieu of, or in addition to, the SME 102, which is associated with Company A. In this scenario, the notification message to SME 102 may include a portion or all of the subscriber enriching information described above. Namely, the third party partner notification may also be an SMS message or other type of messaging service message (e.g., instant message, multimedia message, email message, etc.) that is sent to a separate SME (e.g., SME 103). For example, a retailer identifier, service identifier, or product identifier associated with SC=100 may also be specified in the message, indicating the SC=100 is associated with an advertisement by Company A for a particular sports shoe. The information may be used for maintaining usage measurements and billing (UM&B) statistics associated with specific subscribers, with specific retailers/products/services, and with overall messaging service enriching service performance. For example, FIG. 5 illustrates an exemplary embodiment where the modified SMS message is re-directed to a destination address using a short code (e.g., SC=200) other than the one specified in the original intercepted SMS message. In this scenario, enriching function 114 may determine that another SME (e.g., SME 103) is a more appropriate destination for the subscriber's SC response based on the information acquired from the databases 121-126. For example, the obtained enriching information may reveal that the subscriber frequently visits Sporting Goods Store B (which carries Company A's products). As a result, enriching function 114 is configured to re-direct the SMS response with the enriched data to SME 103. In one embodiment, enriching function 114 performs the routing function by replacing the short code destination address in the SMS message with a short code address for SME 103. Specifically, network routing element 104 replaces SC=100 (which is associated with SME 102) with SC=200 which corresponds with SME 103, which in turn is associated with Sporting Goods Store B. Likewise, enriching function 114 may instead be configured to route the modified SMS message and a copy of the modified SMS message to the originally specified destination address (SC=100) and an alternate destination address (SC=200), respectively.

In another embodiment, the third party partner notification may also be a copy of the original intercepted SMS response message (i.e., without enriching information). In this scenario, the original SMS message is not modified to include enriching information, and instead the original SMS message is simply re-directed based on the subscriber information obtained from databases 121-126 by enriching function 114. For example, enriching function 114 may utilize information from retail preference database 121 to solely determine an alternative destination address (e.g., SC=200) as opposed to the originally intended destination (SC=100). However, the re-directed message to SME 103 does not contain the enriched data in the message itself.

Similarly, in an alternative embodiment, a copy of the original SMS message is generated and routed to an alternate destination based on the subscriber information that is obtained by the enriching function while the original SMS message is contemporaneously routed to the original destination address. For example, the SMS message copy is directed to SME 103 at SC=200 while the original SMS message is routed to SME 102 at the original destination address SC=100. The subscriber information may be included in the original message, the copy of the original message that is being sent to the alternate destination, both messages, or neither message.

Figure 6:
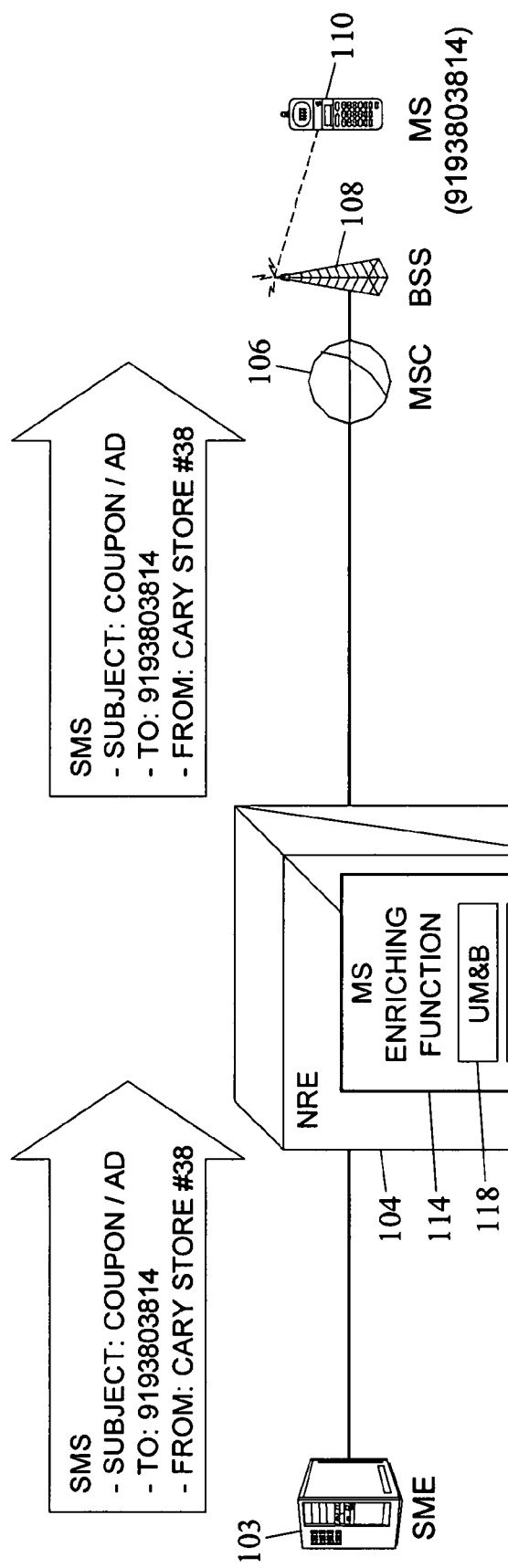
FIG. 6 depicts an SME responding to a mobile subscriber by sending a coupon via a short messaging service (SMS) message according to an embodiment of the subject matter described herein.

After receiving an SMS response message (i.e., original or modified) from network routing element 104, an SME may be configured to issue a reply message. FIG. 6 illustrates one embodiment where SME 103 is configured to respond to the received SMS message. For example, SME 103 (or any other receiving SME) may respond by transmitting an SMS reply message that contains a coupon or a more detailed advertisement. In this scenario, the coupon or advertisement relates directly to Sporting Goods Store B. The message containing the coupon is first received by network routing element 104, which then forwards the message to the intended MS, e.g., MS 110.

Figure 7:
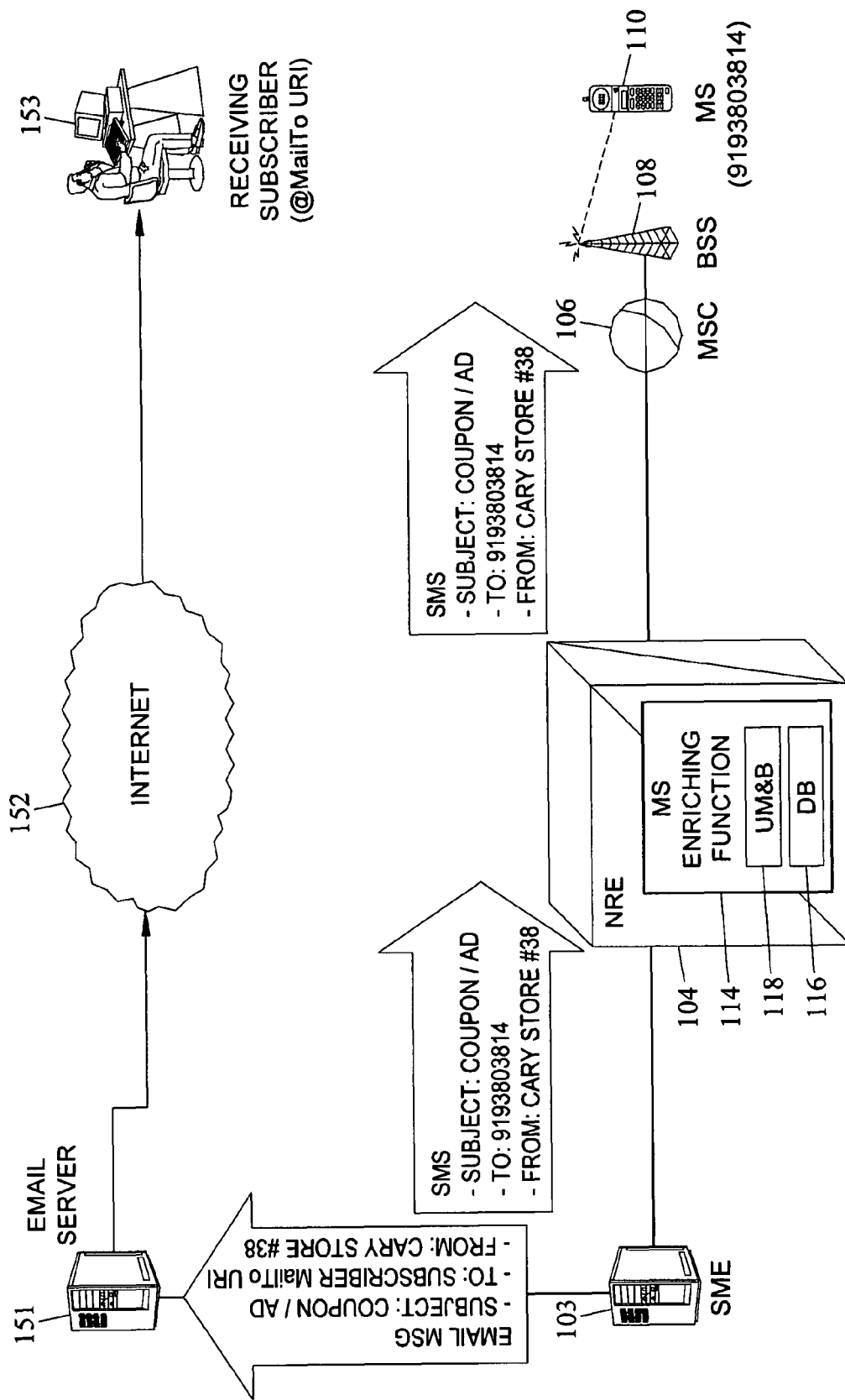
FIG. 7 depicts an SME responding to a mobile subscriber by sending a coupon via an SMS message and e-mail according to an embodiment of the subject matter described herein.

In addition to providing a coupon to MS 110, a transmitting SME may also send the coupon or advertisement data via a different medium. For example, network routing element 104 may acquire the subscriber's email information (e.g., email address or "MAIL TO" URI) from an ENUM database 125 or other DNS-like database. In one implementation, message service enriching function 114 may query ENUM database 124 based on calling party information in an SMS response message to obtain a VRI associated with the SMS sending party. The present subject matter may entail configuring enriching function 114 to provide the subscriber URI or email address to one or more SME destination addresses. A receiving entity, such as SME 103, associated with the destination address(es) may then utilize the URI or email address to contact the subscriber. For example, FIG. 7 illustrates SME 103 sending a coupon to a subscriber via an email message in addition to the SMS message. SME 103 transmits the email message to email server 151, which then delivers the message to a computer, personal digital assistant (PDA), or like device that is associated with the receiving subscriber 153 via Internet 152. Similarly, SME 103 also transmits an SMS message containing the coupon to MS 110. In one embodiment, the email message may be sent to the subscriber in lieu of the SMS message.

Figure 8:
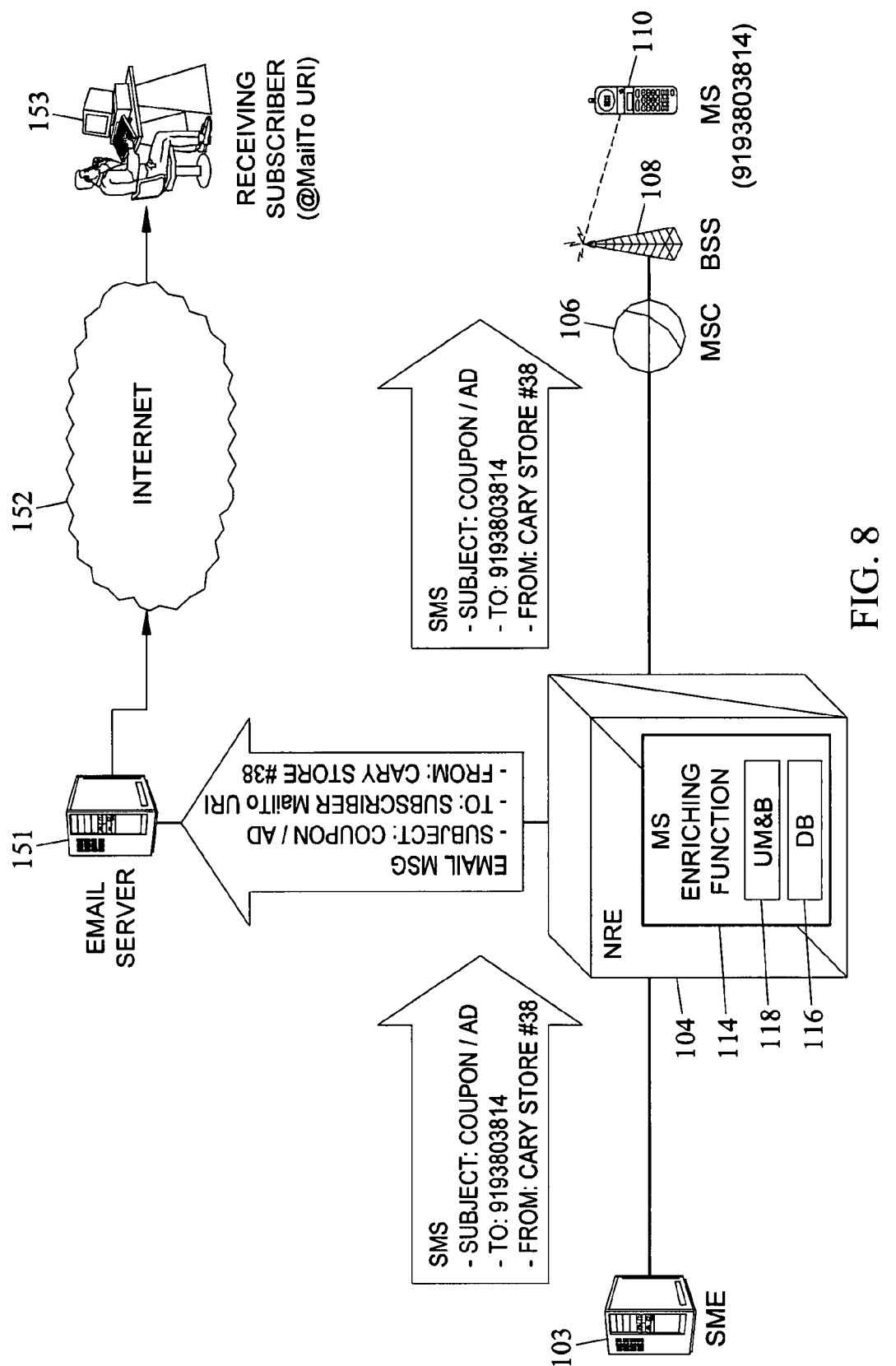
FIG. 8 depicts a network routing element responding to a mobile subscriber by sending a coupon via an SMS message and e-mail according to an embodiment of the subject matter described herein.

In an alternate embodiment shown in FIG. 8, enriching function 114 is adapted to utilize the obtained URI or email address to generate an email address on behalf of the retailer and third party partners. More specifically, enriching function 114 is configured to send an e-mail to the subscriber's computer 153 in the place of SME 102 and/or SME 103. In another embodiment, an additional "follow-up" SMS message may also be sent by the retailer (e.g., SME 102) and third party partners (e.g., SME 103).

Figure 9:
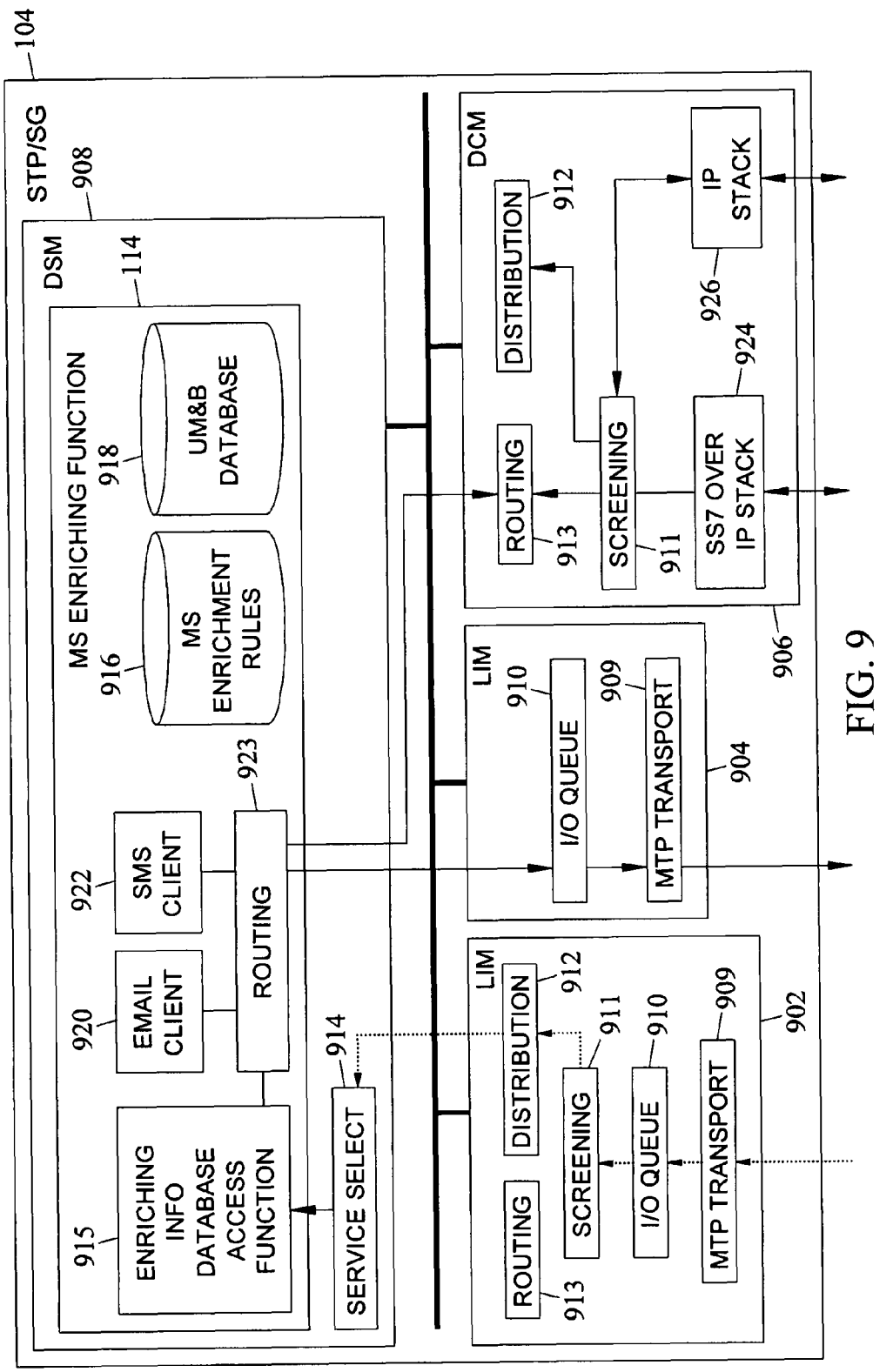
FIG. 9 depicts and exemplary signaling transfer point/signaling gateway architecture with messaging service enriching functionality according to an embodiment of the subject matter described herein.

Shown in FIG. 9 is an exemplary internal architecture of a network routing element 104 (e.g., STP/SG/SMG) that may be used with embodiments of the present subject matter. Network routing element 104 includes one or more SS7 link interface modules (LIMs) 902 and 904 that are adapted to send and receive SS7 messages, including SS7 MAP SMS messages, a data communications module (DCM) 906 that sends and receives messages over IP signaling links, and a database services module (DSM) 908 that provides one or more database-related services, such as providing enriched message service as described herein. LIM 902 includes a message transfer part (MTP) transport function 909 that implements SS7 MTP layers 1 and 2 and interfaces with TDM or ATM-based SS7 signaling links, an I/O queue 910 that stores messages for processing by higher or lower layers, a screening function 911 that identifies as candidates for messaging service enrichment processing. Messages identified as candidates for messaging service enrichment processing are directed via a LIM-based distribution function 912 to DSM 908 that is configured to provide messaging service enriching or other database processing. LIM 902 also includes a routing function 913 for routing messages that do not require internal processing by network routing element 100.

DSM 908, which is configured to provide messaging service enriching processing, includes a service selection function 914 and messaging service enriching application/function 114. Service selection function 914 may select a service to be provided for a received message. For example, service selection function 914 may select messaging service enriching service for received SMS or MMS messages. Messaging service enriching application/function 114 includes an enriching information database access function, or any other like software, for generating enriching information database queries and for receiving and interpreting the associated database responses. An email client 920 is adapted to generate email messages, and a messaging service client 922 is adapted to generate SMS or MMS messages. A routing function 923 is adapted to provide network routing rules/information/policy for email, SMS, MMS, or other messaging service messages. An enriching rules/policy database 116 is adapted to maintain message enriching rules, and a UM&B database 118 is adapted to maintain usage measurements and billing information for enriching service transactions.

LIM 904 may be similarly configured to LIM 902. Hence, a description of all of the components of LIM 904 will not be repeated herein. In the illustrated example, the components of LIM 904 associated with the processing of outbound messages are shown. I/O queue 910 of LIM 904 queues messages that have been processed or routed by another module in routing element 100. MTP transport function 909 transports outbound messages over SS7 signaling links.

DCM 906 sends and receives messages over IP signaling links. In the illustrated example, DCM 906 includes an SS7 over IP stack 924 for sending and receiving SS7 messages, such as SS7 based MAP messages, over IP signaling links and an IP stack for sending and receiving non-SS7 messages, such as email messages, over an IP network. DCM 906 also includes screening function 911, distribution function 912, and routing function 913 described above with respect to LIM 902.

In operation, when a messaging service message, such as a MAP-based SMS response message from a mobile station sent in response to an SMS-based advertisement, is received by LIM 902, screening function 911 identifies the message as a candidate for messaging service enrichment processing. The received message is provided to distribution function 912, which forwards the message to DSM 908. At DSM 908, service selection function 914 identifies the message as an SMS message and selects messaging service enrichment as the service to be provided for the message. Messaging service enriching function 114 accesses enriching rules database 116 to identify the type of enrichment service to be provided. In this example, it is assumed that the enrichment rules indicate that subscriber information is to be incorporated in the SMS response message and that a copy of the enriched response message is to be provided to a third party. Accordingly, enriching information database access function 915 queries one or more enriching information databases, such as any of databases 121-126 illustrated in FIG. 1 and receives a response. Enriching information database access function 915 incorporates the enriching information received in the response message into a copy of the original SMS response message. Enriching information database access function 915 then sends the copy of the original SMS message to a third party, such as a partner of the original destination of the received response message. Routing function 923 may route the original response message to its intended destination via LIM 904. Routing function 923 may route the enriched copy of the original SMS response message to the third party destination via DCM 906.

Figure 10:
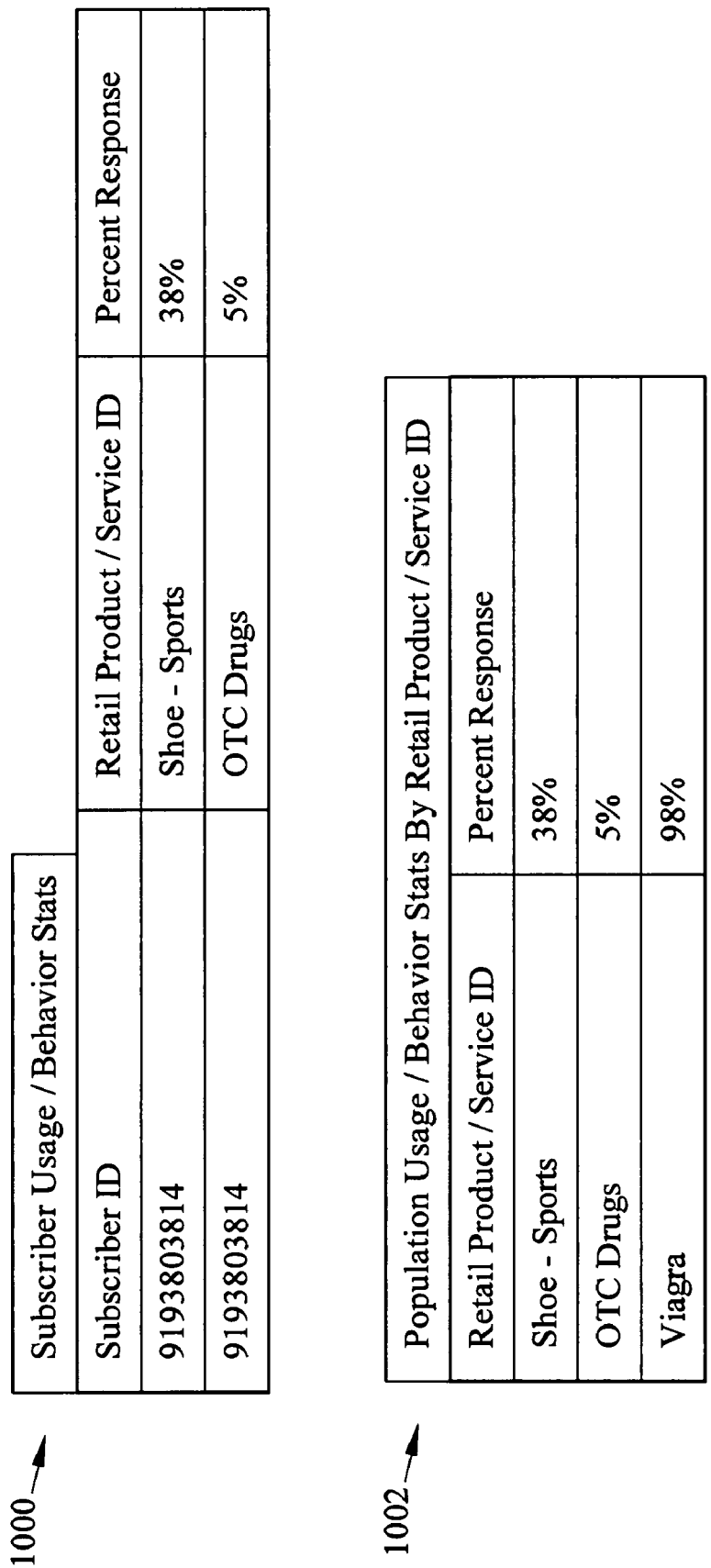
FIG. 10 is a diagram illustrating exemplary usage measurements that may be generated based on use of an enriched messaging service according to an embodiment of the subject matter described herein.

As illustrated in FIG. 9, STP 104 may store usage measurements and billing data in database 118. This data may be used for a variety of purposes. One purpose may include generating usage measurements or bills based on user responses to enriched message service messages as described herein. FIG. 10 is a diagram illustrating usage data that may be generated using the data stored in database 118. Referring to FIG. 10, a first table 1000 includes response percentages based on different product or service categories for a subscriber. In the illustrated example, the subscriber corresponding to subscriber ID 9193803814 responded to SMS ads relating to sport shoes 38% of the time and ads relating to over-the-counter drugs 5% of the time. This data may be used to populate retail preference database 121 illustrated in FIG. 1.

In FIG. 10, a second table 1002 includes usage data for a population. The usage data includes percentage responses of a population for different categories of products or services.

This data may also be used to populate retail preference database 121 so that a subscriber is presented with ads that a population is likely to respond to.

Thus, the subject matter described herein includes methods, systems, and computer program products for providing an enriched messaging service in a communications network where messaging service messages are intercepted and enriched with subscriber information that facilitates intelligent processing or interpretation of the message. Providing such information in a message in route allows the ultimate destination of the message to more intelligently process the message by providing that destination access to information that the destination may not otherwise have access to.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing an enriched messaging service in a communications network, the method comprising:
    (a) receiving a messaging service message addressed to a first destination address, wherein the messaging service message is a short message service (SMS) or multimedia message service (MMS) message, wherein the messaging service message comprises a reply generated by a mobile station in response to an ad for a product or service;
    (b) utilizing a subscriber identifier in the messaging service message to access subscriber information, the subscriber identifier identifying a subscriber that is a sender of the messaging service message generated by the mobile station, the subscriber information being contained in at least one subscriber information database;
    (c) placing the accessed subscriber information in the messaging service message to create an enriched message, wherein the accessed subscriber information includes subscriber retail preference information in addition to routing or delivery information for delivering the enriched message; and
    (d) transmitting the enriched message towards a third party not specified in the original messaging service message, wherein the third party is determined based on the accessed subscriber information.

2. The method according to claim 1, wherein the enriched message is transmitted to the first destination address.

3. The method according to claim 2, wherein the enriched message is transmitted to the first destination address and a copy of the enriched message is transmitted to a second destination address.

4. The method according to claim 1, wherein the enriched message is transmitted to a second destination address in lieu of the first destination address.

5. The method according to claim 4, wherein the second destination address is determined using the enriching information.

6. The method of claim 1 wherein utilizing the subscriber identifier to access subscriber information includes querying an E.164 numbering (ENUM) server to obtain at least one uniform resource identifier (URI) for the subscriber and wherein incorporating the accessed subscriber information in the messaging service message includes incorporating the at least one URI in the message.

7. The method of claim 6 comprising utilizing the URI to redirect the message to an email server.

8. The method of claim 7 comprising, at the email server, sending a targeted advertisement to the subscriber using the at least one URI.

9. The method of claim 1 wherein the messaging service message comprises a reply message generated by a mobile station in response to an ad, wherein the subscriber information incorporated in the messaging service message includes subscriber retail preference information, and wherein the method further comprises extracting the subscriber retail preference information from the enriched message and using the subscriber retail preference information to send an additional ad to the subscriber.

10. The method of claim 1 wherein the enriching information includes one or more of subscriber location information, subscriber presence information, and subscriber calling name (CNAM) information.

11. The method of claim 1 comprising generating usage measurements or billing data based on subscriber responses to services provided to the subscriber using enriched messaging service messages.

12. A system for providing an enriched messaging service in a communications network, the system comprising:
    (a) a plurality of databases containing subscriber information; and
    (b) a network routing element for receiving a messaging service message addressed to a first destination address, wherein the messaging service message is a short message service (SMS) or multimedia message service (MMS) message, wherein the messaging service message comprises a reply generated by a mobile station in response to an ad for a product or service, for utilizing a subscriber identifier in the messaging service message to access subscriber information associated with the subscriber identifier in at least one of the databases, the subscriber identifier identifying a subscriber that is a sender of the messaging service message generated by the mobile station, for placing the accessed subscriber information in the messaging service message to create an enriched message, wherein the accessed subscriber information includes subscriber retail preference information in addition to routing or delivery information for delivering the enriched message, and for transmitting the enriched message towards a third party not specified in the original messaging service message, wherein the third party is determined based on the accessed subscriber information.

13. The system of claim 12, wherein the enriched message is transmitted to the first destination address.

14. The system of claim 12 wherein the enriched message is transmitted to a second destination address in lieu of the first destination address.

15. The system of claim 14, wherein the second destination address is determined using the enriching information.

16. The system of claim 12, wherein the enriched message is transmitted to the first destination address and a copy of the enriched message is transmitted to a second destination address.

17. The system of claim 12 wherein utilizing the subscriber identifier to access subscriber information includes querying an E.164 numbering (ENUM) server to obtain at least one uniform resource identifier (URI) for the subscriber and wherein incorporating the accessed subscriber information in the messaging service message includes incorporating the at least one URI in the message.

18. The system of claim 17 comprising utilizing the URI to redirect the message to an email server.

19. The system of claim 18 comprising, at the email server, sending a targeted advertisement to the subscriber using the at least one URI.

20. The system of claim 12 wherein the messaging service message comprises a reply message generated by a mobile station in response to an ad, wherein the subscriber information incorporated in the messaging message includes subscriber retail preference information, and wherein the method further comprises extracting the subscriber retail preference information from the enriched message and using the subscriber retail preference information to send an additional ad to the subscriber.

21. The system of claim 12 wherein the enriching information includes one or more of subscriber location information, subscriber presence information, and subscriber calling name (CNAM) information.

22. The system of claim 12 comprising generating usage measurements or billing data based on subscriber responses to using enriched messaging service messages.

23. A computer program product comprising computer executable instructions embodied in a non-transitory computer readable medium for performing steps comprising:
   (a) receiving a messaging service message addressed to a first destination address, wherein the messaging service message is a short message service (SMS) or multimedia message service (MMS) message, wherein the messaging service message comprises a reply generated by a mobile station in response to an ad for a product or service;
   (b) utilizing a subscriber identifier in the messaging service message to access subscriber information, the subscriber identifier identifying a subscriber that is a sender of the messaging service message generated by the mobile station, the subscriber information being contained in at least one subscriber information database;
   (c) placing the accessed subscriber information in the messaging service message to create an enriched message, wherein the accessed subscriber information includes subscriber retail preference information in addition to routing or delivery information for delivering the enriched message; and
   (d) transmitting the enriched message towards a third party not specified in the original messaging service message, wherein the third party is determined based on the accessed subscriber information.

24. A method for processing a messaging service message in a communications network, the method comprising:
   (a) receiving a messaging service message to a first destination address, wherein the messaging service message is a short message service (SMS) or multimedia message service (MMS) message, wherein the messaging service message comprises a reply generated by a mobile station in response to an ad for a product or service;
   (b) utilizing a subscriber identifier in the messaging service message that indicates a sender of the messaging service message to access subscriber information concerning the sender of the messaging service message generated by the mobile station, the subscriber information being contained in at least one subscriber information database;
   (c) wherein the subscriber information concerning the sender includes subscriber retail preference information in addition to routing or delivery information for delivering the messaging service message; and
   (d) utilizing the accessed subscriber information concerning the sender so that at least a portion of the messaging service message is routed to a destination address associated with a third party not specified in the original messaging service message, wherein the third party is determined based on the accessed subscriber information.

* * * * *